United States Patent
Boguhn et al.

(10) Patent No.: US 8,935,843 B2
(45) Date of Patent: Jan. 20, 2015

(54) TEMPERATURE SENSOR AND METHOD FOR ITS MANUFACTURE

(75) Inventors: Dirk Boguhn, Munich (DE); Jiri Holoubek, Wattwil (CH); Axel Pfau, Aesch (CH); Oliver Popp, Oberwil (CH); Jiri Polak, Neu St. Johann (CH)

(73) Assignee: Endress + Hauser FLowtec AG, Reinach (CH)

( * ) Notice: Subject to any disclaimer, the term of this patent is extended or adjusted under 35 U.S.C. 154(b) by 0 days.

(21) Appl. No.: 13/444,258

(22) Filed: Jul. 9, 2012

(65) Prior Publication Data

US 2012/0266451 A1 Oct. 25, 2012

Related U.S. Application Data

(62) Division of application No. 12/736,190, filed as application No. PCT/EP2009/052942 on Mar. 12, 2009, now Pat. No. 8,166,813.

(30) Foreign Application Priority Data

Mar. 20, 2008 (DE) .................. 10 2008 015 359

(51) Int. Cl.
 *G01F 1/68* (2006.01)
 *G01K 1/08* (2006.01)
 (Continued)

(52) U.S. Cl.
 CPC . *G01F 1/69* (2013.01); *G01F 1/684* (2013.01)
 USPC ............. 29/521; 374/141; 374/163; 374/185; 338/22 R; 338/25; 338/28; 73/170.12; 73/204.11; 73/204.22

(58) Field of Classification Search
 CPC ............ G01K 13/02; G01K 2013/026; G01K 2013/024; G01K 7/22; G01K 7/16; G01K 7/02; G01K 7/18; G01K 1/08; G01K 7/183; G01K 1/14; H01C 7/008; H01C 7/02; H01C 7/04; G01P 5/12; G01F 1/6842
 USPC ................ 29/521, 592.1; 374/141, 185, 208; 170/12, 204.11, 204.22, 204.25, 170/204.26, 866.5; 702/47; 338/18, 25, 28; 136/201, 232; 137/230
 See application file for complete search history.

(56) References Cited

U.S. PATENT DOCUMENTS 3,061,806 A * 10/1962 Stevens .......................... 338/28
3,147,457 A * 9/1964 Gill et al. ....................... 338/28
(Continued)

FOREIGN PATENT DOCUMENTS

DE DBP 103 39 40 7/1958
DE 24 47 617 4/1976
(Continued)

OTHER PUBLICATIONS

English Translation of IPR.

*Primary Examiner* — David Bryant
*Assistant Examiner* — Jun Yoo
(74) *Attorney, Agent, or Firm* — Bacon & Thomas, PLLC

(57) ABSTRACT

A thermal, flow measuring device for determining and/or monitoring the flow of a measured medium through a measuring tube. The thermal, flow measuring device includes: a first pin-shaped shell and at least a second pin-shaped shell; a first resistance thermometer and at least a second resistance thermometer. At least the first resistance thermometer is embodied so as to be heatable, wherein the resistance thermometers, in each case, have a first surface, and at least a second surface, which lies opposite the first surface. The first pin-shaped shell surrounds the first resistance thermometer, and the second pin-shaped shell surrounds the second resistance thermometer. The pin-shaped shells are fillable with a fill material. In each case, at least one spacer is placeable between the pin-shaped shell and the first surface of the resistance thermometer, and the second surface of the resistance thermometer is at least partially covered with fill material.

8 Claims, 2 Drawing Sheets

(51) Int. Cl.
*G01F 1/69* (2006.01)
*G01F 1/684* (2006.01)

(56) References Cited

U.S. PATENT DOCUMENTS

| | | | | |
|---|---|---|---|---|
| 3,592,059 | A | * | 7/1971 | Chilton .................. 374/165 |
| 3,832,668 | A | * | 8/1974 | Berman .................. 338/225 D |
| 3,845,443 | A | * | 10/1974 | Fisher .................. 338/25 |
| 5,207,765 | A | * | 5/1993 | Eiermann et al. .......... 73/204.26 |
| 5,720,556 | A | * | 2/1998 | Krellner .................. 374/185 |
| 5,726,624 | A | * | 3/1998 | Caffee et al. .................. 338/28 |
| 6,297,723 | B1 | * | 10/2001 | Shoji et al. .................. 338/28 |
| 6,462,640 | B2 | * | 10/2002 | Muziol .................. 338/28 |
| 6,628,202 | B2 | | 9/2003 | McQueen |
| 6,666,578 | B2 | | 12/2003 | Gibbs |
| 6,971,274 | B2 | | 12/2005 | Olin |
| 7,197,953 | B2 | | 4/2007 | Olin |
| 7,748,267 | B2 | * | 7/2010 | Olin et al. .................. 73/204.22 |
| 7,891,238 | B2 | | 2/2011 | Becke |
| 7,982,580 | B2 | * | 7/2011 | Weber et al. .................. 338/28 |

FOREIGN PATENT DOCUMENTS

| | | |
|---|---|---|
| DE | G 86 26 547.4 | 3/1987 |
| DE | 38 41 135 A1 | 6/1990 |
| DE | 40 17 877 A1 | 12/1991 |
| DE | G 94 06 603.5 | 9/1994 |
| DE | 103 61 564 A1 | 7/2005 |
| FR | 1 238 716 A | 8/1960 |

* cited by examiner

TEMPERATURE SENSOR AND METHOD FOR ITS MANUFACTURE

CROSS-REFERENCE TO RELATED APPLICATION

This application is a Divisional which claims the benefit of U.S. application Ser. No. 12/736,190, filed on Sep. 17, 2010.

TECHNICAL FIELD

The present invention relates to a thermal, flow measuring device for determining and/or monitoring the flow of a measured medium through a measuring tube. The measuring device has a first pin-shaped shell and at least a second pin-shaped shell, a first resistance thermometer and at least a second resistance thermometer. At least the first resistance thermometer is embodied so as to be heatable; wherein the resistance thermometers, in each case, have a first surface and at least a second surface, which lies opposite the first surface. The first pin-shaped shell surrounds the first resistance thermometer, and the second pin-shaped shell surrounds the second resistance thermometer.

BACKGROUND DISCUSSION

Conventional thermal, flow measuring devices usually use two temperature sensors which are embodied as equally as possible, and which are arranged in (most often pin-shaped) metal housings—so-called stingers—and which are in thermal contact with the medium flowing through a measuring tube or through the pipeline. For industrial application, the two temperature sensors are usually installed in a measuring tube; the temperature sensors can, however, also be installed directly in the pipeline. One of the two temperature sensors is a so-called active temperature sensor, which is heated by means of a heating unit. As the heating unit, either an additional resistance heating is provided, or the temperature sensor itself is a resistance element—e.g. an RTD (Resistance Temperature Device) sensor—which is heated through conversion of electrical power, e.g. through a corresponding variation in the electrical measuring current. The second temperature sensor is a so-called passive temperature sensor; it measures the temperature of the medium.

In a thermal, flow measuring device, the heatable temperature sensor is usually heated in such a way, that a fixed temperature difference arises between the two temperature sensors. Alternatively, it is also known to supply a constant heating power via a regulating/control unit.

If there is no flow in the measuring tube, an amount of heat which is constant in time is then required for maintaining the predetermined temperature difference. If, in contrast, the medium to be measured is in movement, the cooling of the heated temperature sensor is essentially dependent on the mass flow of the medium flowing past. Since the medium is colder than the heated temperature sensor, heat from the heated temperature sensor is transported away by the flowing medium. In order to then maintain the fixed temperature difference between the two temperature sensors in the case of a flowing medium, an increased heating power is required for the heated temperature sensor. The increased heating power is a measure for the mass flow of the medium through the pipeline.

If, in contrast, a constant heating power is fed in, the temperature difference existing between the two temperature sensors as a result of the flow of the medium is lessened. The particular temperature difference is then a measure for the mass flow of the medium through the pipeline or through the measuring tube.

There is, thus, a functional relationship between the heating energy needed for heating the temperature sensor and the mass flow through a pipeline or through a measuring tube. The dependence of the so-called heat transfer coefficient on the mass flow of the medium through the measuring tube (or through the pipeline) is utilized in thermal, flow measuring devices for determining the mass flow. Devices which operate according to this principle are available from the assignee under the name "t-switch", "t-trend" or "t-mass".

Until now, mainly RTD-elements with helically wound platinum wires have been applied in thermal, flow measuring devices. In the case of thin film, resistance thermometers (TFRTDs), a meander-shaped platinum layer is conventionally vapor deposited onto a substrate. Over this is applied a glass layer, for protecting the platinum layer. The cross section of thin film, resistance thermometers is rectangular, in contrast to RTD elements having a round cross section. The heat transfer in the resistance element and/or from the resistance element accordingly occurs via two oppositely lying surfaces, which together make up a large part of the total surface of a thin film, resistance thermometer.

The installation of a cuboid-shaped thin film, resistance thermometer into a round, pin-shaped shell is achieved in U.S. Pat. No. 6,971,274 and U.S. Pat. No. 7,197,953 in the following ways. The thin film, resistance thermometer is inserted into a metal spacer with a rectangular recess in such a way, that at least the two oppositely lying large surfaces of the thin film, resistance thermometer have virtually gap-free contact with the surfaces of the spacer lying opposite them. For this, the spacer has a rectangular recess, which is manufactured corresponding to the outer dimensions of the thin film, resistance thermometer. The spacer should tightly hold the thin film, resistance thermometer. In this regard, the spacer and thin film, resistance thermometer virtually form a press fit. The spacer itself and the pin-shaped shell likewise form a press fit. In this way, use of a potting compound or another sort of fill material is unnecessary. The advantage of this construction is good heat transfer between the thin film, resistance thermometer and measured medium on all sides, through the spacer. However, due to the firm fit of the thin film, resistance thermometer and/or due to different coefficients of thermal expansion for the participating materials, mechanical stresses arise in the thin film, resistance thermometer.

SUMMARY OF THE INVENTION

An object of the invention is to measure with high accuracy and a small use of energy, the temperature and/or flow of a measured medium.

The object is achieved by a thermal, flow measuring device for determining and/or monitoring flow of a measured medium through a measuring tube, wherein the thermal, flow measuring device includes: a first pin-shaped shell and at least a second pin-shaped shell; and a first resistance thermometer and at least a second resistance thermometer; wherein at least the first resistance thermometer is embodied so as to be heatable; wherein the resistance thermometers, in each case, have a first surface and at least a second surface, which lies opposite the first surface; wherein the first pin-shaped shell surrounds the first resistance thermometer and the second pin-shaped shell surrounds the second resistance thermometer; wherein the pin-shaped shells are fillable with a fill material; wherein, in each case, at least one spacer is placeable between the pin-shaped shell and the first surface of the resistance thermometer, and the second surface of the resistance thermometer is at least partially covered with fill material. The resistance thermometers are preferably thin film, resistance thermometers. The pin-shaped shells and spacers are, in such case, advantageously in close contact. Likewise, the first surface of a resistance thermometer is, in each case, preferably in close contact with the surface of the respective spacer lying opposite it.

The thermal, flow measuring device is preferably a thermal, mass flow measuring device, which, based on the principle of thermal, mass flow measurement, ascertains and/or monitors flow (especially mass flow) of a measured medium through a measuring tube. The pin-shaped shell is preferably tubular, with a first end and a second end, wherein the first end is securable in a sensor holder, and thus wherein the pin-shaped shell can be secured at its first end in a sensor holder. Thus, during an operating state, the pin-shaped shell contacts the measured medium at least with its second end. In addition to the heated, first resistance thermometer, the thermal, flow measuring device has a second resistance thermometer. This is, for example, unheated, and supplies information concerning the current temperature $T_2$ of the medium. For determining and/or monitoring flow of a measured medium through the measuring tube, the measuring system in which the thermal, flow measuring device is installed includes a control/evaluation unit, which, on the basis of the temperature difference, $\Delta T=T_1-T_2$ between the two temperature sensors and/or on the basis of the heating power fed to the heatable temperature sensor, ascertains flow (in this example, mass flow) of the measured medium through the measuring tube or pipeline. This control/evaluation unit is preferably part of the thermal, flow measuring device itself.

The resistance thermometers are preferably so-called thin film, resistance thermometers, also known by the name "thin film resistance temperature device" or "thin film resistance temperature detector" (TFRTD). Conventional TFRTDs have an approximately rectangular cross section. These cuboid-shaped TFRTDs have, thus, two oppositely lying large surfaces, via which heat input, or heat transfer, mainly takes place.

In an advantageous further development of the thermal, flow measuring device of the invention, the pin-shaped shells have a first end and a second end, wherein the pin-shaped shells are securable at their first end in a sensor holder, and wherein the second end of the pin-shaped shells can, in each case, be tightly sealed by a plug.

The plug can, in such case, be composed of heat-conducting or heat-insulating material, depending on the application. Preferably, it is composed of material which conducts heat well. Suitable materials are those sufficiently described in the state of the art. Included among these are, above all, copper and copper alloys.

An advantageous further development of the thermal, flow measuring device of the invention provides that the first ends of the pin-shaped shells are open, and the second ends of the pin-shaped shells are open, and that the pin-shaped shells, in each case, are fillable with fill material via their first open ends, and that the spacer, in each case, is insertable into the pin-shaped shell through the second open end of the pin-shaped shell. The pin-shaped shell is thus provided with its internal components mainly from the second end. Its first end can, in such case, already be placed in the sensor holder. The introduction of the spacer preassembled with the resistance thermometer into the second end of the pin-shaped shell offers the following advantage. Since the resistance thermometer is placed very near to the second end of the pin-shaped shell, the path, which the spacer (with the resistance thermometer assembled therewith) must travel in the pin-shaped shell, is very short in comparison to a standard installation through the first end. In this way, the position of the resistance thermometer in the pin-shaped shell is determinable during assembly. In this regard, the spacer, preassembled with the resistance thermometer, is first pressed into the pin-shaped shell, and the plug is then pushed in, following the spacer. Only thereafter is the fill material filled in from the first end of the pin-shaped shell.

A very advantageous further development of the thermal, flow measuring device of the invention provides that the resistance thermometer is connectable with the spacer in a material-bonded manner.

In a preferred embodiment, the resistance thermometer is soldered with its first surface onto the spacer. In another variant, the resistance thermometer is held tightly to the spacer with a clamp. This naturally does not represent a material-bonded connection. In an additional variant, the resistance thermometer, soldered onto the spacer, is additionally held tightly to the spacer with a clamp. In this way, a detachment of the resistance thermometer from the spacer in the case of a temporary dissolution of a solder connection by the heat input from welding the plug to the pin-shaped shell is prevented.

Another advantageous further development of the thermal, flow measuring device of the invention provides that the plug is connectable with the pin-shaped shell in a material-bonding manner. Methods for connecting the plug with the pin-shaped shell in a material-bonding manner are sufficiently known to those skilled in the art. Included in this regard are, for example, welding, adhesive bonding, brazing and soldering. Laser welding is to be viewed as especially advantageous. Due to the very limited, narrow region of heat input through welding into the plug and/or into the adjoining components (such as, for example, the spacer with the preassembled resistance thermometer), the components are only exposed to a small thermal, and/or a concomitant mechanical, loading by the welding. If, for example, the resistance thermometer is soldered to the spacer, trials have shown that, when welding the plug with the pin-shaped shell, in the case of adequate structural size of the components, the temperature of the solder connection does not reach the critical level, at which it would be damaged. In an embodiment of the solution of the invention, the plug is thus connected with the pin-shaped shell in a material-bonding manner by means of a laser welding method.

In an advantageous further development of the thermal, flow measuring device of the invention, it is provided that the spacer is connectable with the plug in a material-bonding manner. In such case, the plug can be manufactured from the same material as the spacer, or the plug can be an integral component of the spacer, or the materials of plug and spacer can also differ from each other.

The spacer is especially advantageously composed of a material which conducts heat well, e.g. of copper or copper alloys. Conventionally, the pin-shaped shell is composed of stainless steel, e.g. of nickel-based alloys. Stainless steel usually has a rather low thermal conductivity. Thus, the thermal conductivity of X2CrNiMo 17-12-3 or also 1.4404 lies at 15 W/(mK). By way of comparison, the thermal conductivity of pure copper lies at about 400 W/(mK).

If the plug is made, for example, of copper, and the measured medium which contacts the thermal, flow measuring device should not, and/or is not permitted to, come in contact with copper, a cap is additionally to be applied between the measured medium and the plug as the terminal part of the second end of the pin-shaped shell, or a nickel layer is to be vapor deposited over the bare copper. In another variant, the plug is composed of stainless steel, especially of the same material as the pin-shaped shell. It thereby forms the terminal part of the second end of the pin-shaped shell.

In an advantageous further development of the thermal, flow measuring device of the invention, the spacer and the pin-shaped shell form a press fit. The spacer and pin-shaped shell are dimensioned in such a manner, that the fit between the spacer and pin-shaped shell is a press fit. In contrast therewith, the plug advantageously engages in a loose fit with, or a light push-in seating in, the pin-shaped shell.

According to an advantageous further development of the solution of the invention, the spacer is cylindrical, wherein it has a groove (especially one with a trapezoidally shaped, or a rectangular, cross section), especially a groove extending in the direction of the longitudinal axis of the spacer. Basically, the spacer is a dowel with parallel key groove. The parallel key groove can, in such case, extend over the entire dowel length, and thus, for example, be a continuous groove which is manufactured by broaching. This shape especially has advantages with regard to heat transfer, and it facilitates securement—especially soldering—of the resistance thermometer. This form of the spacer is, however, to be seen as especially advantageous in reference to assembly of the spacer. A press fit between the pin-shaped shell and spacer is, then, easy to implement.

The fill material (also called potting compound) is composed, for example, of a powdered form of a material with a lower thermal conductivity, or of a heat insulating paste. Usually, a silicone fill material having a thermal conductivity of about 0.2 W/(mK) is used.

This has advantages both in the case of an unheated sensor, as well as in the case of a heated sensor. The first surface of the resistance thermometer is in contact with the measured medium via a so-called thermal, or heat, bridge with very good heat-conducting properties; the second surface of the resistance thermometer, which lies opposite the first, is, however, heat insulated against the measured medium. The area, into, or from, which a heat transfer takes place, is exactly defined. There results therefrom a directional dependence of the temperature sensor: the sensor is sensitive to the flow direction of the measured medium. Additionally, in the case of a heated sensor, the heat losses in the direction of the sensor housing are considerably lower in comparison with the state of the art.

An especially advantageous embodiment of the solution of the invention provides that the first surface of the resistance thermometers is perpendicular to the principal flow direction of the measured medium in the measuring tube, wherein, in each case, the second surface of the resistance thermometers points in the direction of the flow of the measured medium. In such case, the measuring tube axis most often defines the principal flow direction of the measured medium in the measuring tube. The spacers are thus, in each case, located on the resistance thermometer side exposed to the flow, and the first surface of the resistance thermometer points counter to the principal flow direction of the measured medium in the measuring tube.

Through the construction of the thermal, flow measuring device of the invention, the axial position of the resistance thermometer (or the spacer with applied resistance thermometer) in the pin-shaped shell is known, and, thus, very easily reproducible. The axes of the pin-shaped shells are preferably perpendicular to the flow. Additionally, the orientation of the resistance thermometer in the pin-shaped shell is easy to establish and/or determine.

The object is furthermore achieved by a method for manufacture of a temperature sensor (especially a sensor for application in a thermal, flow measuring device), wherein the sensor includes: at least one tubular, pin-shaped shell having a first open end (wherein the first open end of the pin-shaped shell is held in a sensor holder) and a second end; at least one resistance thermometer having at least a first surface and at least a second surface which lies opposite the first surface; and fill material, which is introducible through the first open end of the pin-shaped shell; wherein the second end of the pin-shaped shell is open; and wherein a spacer with a resistance thermometer secured onto a first surface of the spacer is inserted into the second open end of the pin-shaped shell, and the second open end of the pin-shaped shell is closed with a plug. The closing of the second open end of the pin-shaped shell occurs after the spacer with the applied resistance thermometer has been brought into the pin-shaped shell, and a cable for contacting the resistance thermometer has been led out through the first open end.

Sealed closing of the second end preferably occurs by welding the plug with the pin-shaped shell. The fit of the plug with the pin-shaped shell is, in such case, preferably a loose fit.

In an advantageous form of embodiment of the method of the invention, when the second end of the pin-shaped shell is closed, fill material is filled in through the first end of the pin-shaped shell, and the second surface of the resistance thermometer is at least partially covered.

In an additional advantageous development of the method of the invention, the spacer is connected with the plug in a material-bonding manner. This happens preferably before application of the resistance thermometer and before insertion into the pin-shaped shell.

Another very advantageous further development of the method of the invention provides that the spacer is pushed in during the course of introducing the plug into the pin-shaped shell, wherein the spacer and pin-shaped shell preferably form a press fit. An embodiment provides that the plug is replaced with a sheet metal closure, which is applied to, and seals, the second end of the pin-shaped shell.

The method of the invention determines both the axial position of the resistance thermometer in the pin-shaped shell and the radial orientation of the resistance thermometer in the pin-shaped shell.

BRIEF DESCRIPTION OF THE DRAWINGS

The invention will now be explained in greater detail on the basis of the appended drawing, the sole figure of which shows as follows.

DETAILED DISCUSSION IN CONJUNCTION WITH THE DRAWINGS

Figure 1A:
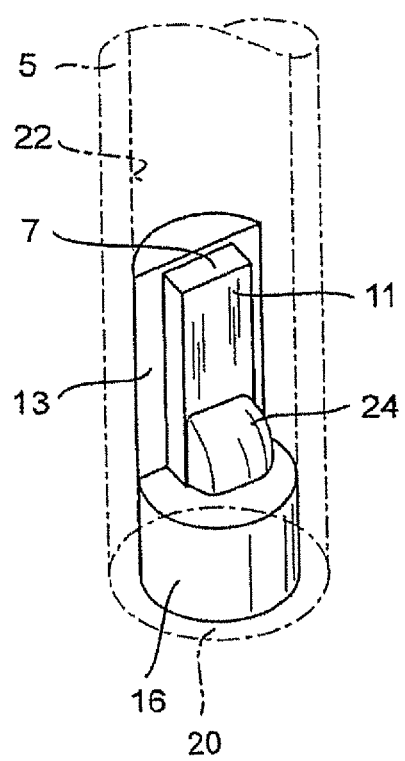
FIG. 1A shows perspectively a first embodiment of a pin-shaped shell of a thermal mass flow meter of the invention.
Figure 2B:
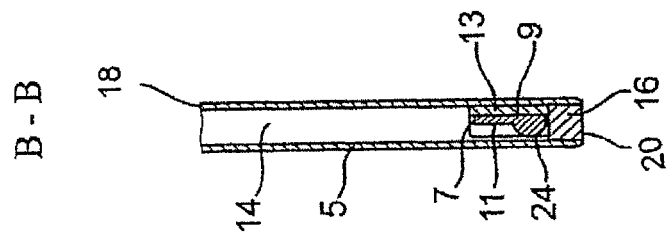
FIG. 2B shows a section view along section B-B of FIG. 2A.

FIG. 1A shows a perspective representation of a thermal mass flow meter with a first sensor tube (embodied as a pin-shaped shell 5) having a first end 18 and a second end 20. The second end 20, which, in an operating state, contacts the measured medium. The first end 18 of the pin-shaped shell 5, which is secured in a housing or a sensor holder, is shown in FIG. 2B.

A plug 16 is welded to the front side of the pin-shaped shell 5 that is to say to the second end 20. Plug 16 and spacer 13 form in this case a one-piece, monolithic component. Spacer 13 is in close contact with the inside 22 of the pin-shaped shell 5. A resistance thermometer 7 is soldered onto the spacer 13. A first surface 9 of the resistance thermometer 7 (FIG. 2B) is, thus, in close contact with the spacer 13. In this way, good heat conduction from the measured medium to the resistance thermometer 7 is assured. A second surface 11 of the resistance thermometer 7 sits freely facing into the space bordered by the pin-shaped shell 5.

The second sensor tube shows another embodiment of the thermal, flow measuring device of the invention. Through the open second end 19 of a pin-shaped shell 4, a spacer 12 has been inserted. Spacer 12 forms a press fit with the pin-shaped shell 4. During assembly, the spacer 12 was pushed by means of a plug 15 in the direction of the first end (not shown) of the pin-shaped shell 4. The plug 15 itself forms a loose fit with the pin-shaped shell 4, and is welded with the latter at its second end 19 by means of a laser welding method. Spacer 12 is composed of a material which conducts heat well. It has a cylindrical shape, with a groove 25 of rectangular cross section extending in the direction of the longitudinal axis over the entire length of the cylinder. Onto the "floor" of the groove 25 (thus onto that surface of the groove 25, to which no other surface of the groove 25 lies opposite), a resistance thermometer 6 is soldered. The second surface 10 of the resistance thermometer 6 is freely facing into the space bordered by the pin-shaped shell 4.

Figure 1B:
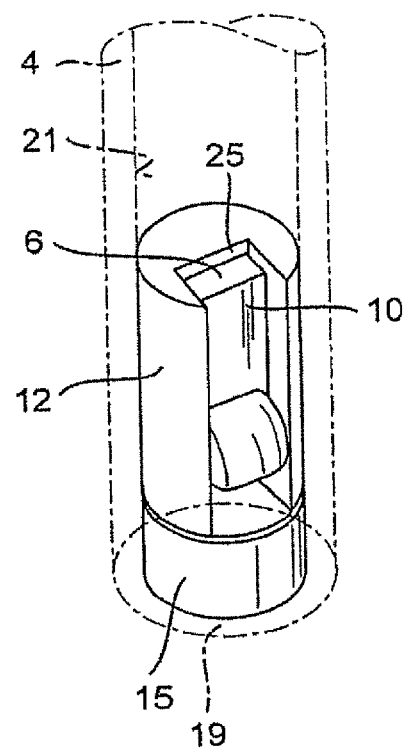
FIG. 1B shows perspectively a second embodiment of a pin-shaped shell of a thermal mass flow meter of the invention.

The free space in the pin-shaped shells 4, 5 is preferably filled, or potted, with a suitable fill material 14 (FIG. 2) having a low thermal conductivity. In this way, the second surfaces 10, 11 of the resistance thermometer 6, 7 will be covered with fill material 14. The fill material 14, as well as a contacting of the resistance thermometers 6, 7 with cables (especially via the tension relief 24), are likewise not shown here. The representation in FIG. 1 shows two different options for embodiment of the invention. The heatable resistance thermometer is not limited to the variant shown. Both resistance thermometers are interchangeable.

The spacers 12, 13 have likewise at least two surfaces. The first surfaces of the spacers 12, 13, on which are placed the first surfaces 8, 9 of the resistance thermometers 6, 7, are embodied congruently to these. The first surfaces 8, 9 of the resistance thermometers 6, 7 and first surfaces of the spacers 12, 13, on which the first surfaces 8, 9 of the resistance thermometers 6, 7 are placed, thus approximately form a positive and a negative. Equally, the second surfaces of the spacers 12, 13 are negatives of the insides 21, 22 of the pin-shaped shells 4, 5. If, thus, the insides 21, 22 of the pin-shaped shells 4, 5 are tubular, the second surfaces of the spacers 12, 13 are correspondingly curved. Both the first surfaces 8, 9 of the resistance thermometers 6, 7 and the first surfaces of the spacers 12, 13 are in close contact, and the second surfaces of the spacers 12, 13 and the insides 21, 22 of the pin-shaped shells 4, 5 are also in close contact.

By installation of the resistance thermometers 6, 7 through the respective second ends 19, 20 of the pin-shaped shells 4, 5, the position of each of the resistance thermometers 6, 7 in the pin-shaped shells 4, 5 with respect to the measured medium is reproducible.

Figure 2A:
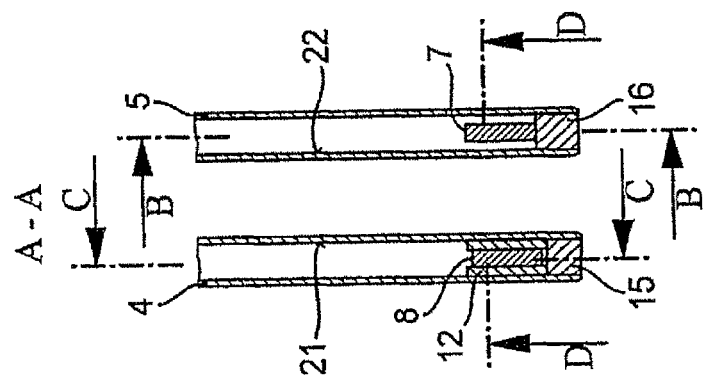
FIG. 2A shows a side-by-side comparison of two different sensors for a thermal flow massing device.
Figure 2C:
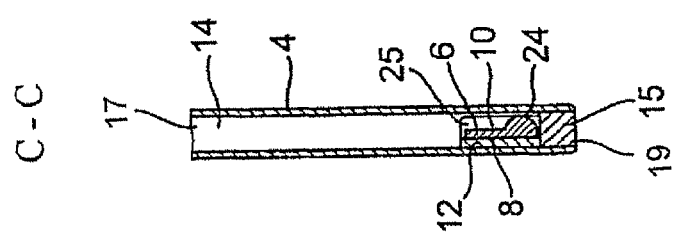
FIG. 2C shows a section view along section C-C of FIG. 2A.

FIG. 2 shows two different sensors for a thermal flow measuring device.

The invention claimed is:

1. A method for manufacture of a temperature sensor, wherein the sensor includes:
at least one tubular, pin-shaped shell having a first open end and a second end, wherein the first open end of the pin-shaped shell is held in a sensor holder and the second end of the pin-shaped shell contacts in an operating state the measured medium; and at least one resistance thermometer having a first surface and at least a second surface, which lies opposite the first surface,
the method comprising the steps of:
providing the second end of the pin-shaped shell to be open;
securing a spacer with a resistance thermometer onto the first surface;
inserting the spacer into the pin-shaped shell through the second open end of the pin-shaped shell; and
closing the second open end of the pin-shaped shell with a plug.

2. The method for manufacture of a temperature sensor as claimed in claim 1, wherein:
in case of a closed second end of the pin-shaped shell, fill material is filled in through the first end of the pin-shaped shell, and the second surface of the resistance thermometer is at least partially covered.

3. The method for manufacture of a temperature sensor as claimed in claim 1, further comprising the step of:
connecting the spacer with the plug in a material-bonding manner.

4. The method for manufacture of a temperature sensor as claimed in claim 1, further comprising the step of:
pushing the spacer into the pin-shaped shell during introduction of the plug.

5. The method for manufacture of a temperature sensor as claimed in claim 1, wherein:
the pin shaped shell and the plug form a closed housing.

6. The method for manufacture of a temperature sensor as claimed in claim 1, wherein:
a free space in the pin shaped shell is filled or potted with a suitable fill material.

7. The method for manufacture of a temperature sensor as claimed in claim 1, wherein:
the resistance thermometer is not in direct contact with the measuring medium.

8. A method for the manufacture of a thermal, flow measuring device, comprising the steps of:
providing a temperature sensor which includes: at least one tubular, pin-shaped shell having a first open end and a second end, wherein the first open end of the pin-shaped shell is held in a sensor holder and the second end of the pin-shaped shell contacts in an operating state the measured medium; and at least one resistance thermometer having a first surface and at least a second surface, which lies opposite the first surface;
providing the second end of the pin-shaped shell to be open;
securing a spacer with a resistance thermometer onto the first surface;
inserting the spacer into the pin-shaped shell through the second open end of the pin-shaped shell; and
closing the second open end of the pin-shaped shell with a plug.

* * * * *